United States Patent [19]

Adamson et al.

[11] 4,132,069
[45] Jan. 2, 1979

[54] INTEGRATED GAS TURBINE ENGINE-NACELLE

[75] Inventors: Arthur P. Adamson; Donald F. Sargisson, both of Cincinnati; Charles L. Stotler, Jr., Fairfield, all of Ohio

[73] Assignee: The United States of America as represented by the Administrator of the National Aeronautics and Space Administration, Washington, D.C.

[21] Appl. No.: 753,452

[22] Filed: Dec. 22, 1976

Related U.S. Application Data

[63] Continuation of Ser. No. 522,108, Nov. 8, 1974, abandoned.

[51] Int. Cl.² .......... F02K 3/06; F02K 1/20; F02C 3/06; F02C 7/20
[52] U.S. Cl. .......... 60/226 R; 60/226 A; 60/39.31; 244/54; 137/15.1; 415/201; 415/200
[58] Field of Search .......... 60/39.31, 226 R, 226 A, 60/262, 224; 415/79, 201, 216–218, 200, 209, 210, 174, 191–195; 244/54; 137/15.1, 15.2; 181/33 H, 33 HA; 277/56

[56] References Cited

U.S. PATENT DOCUMENTS

| | | | |
|---|---|---|---|
| 2,849,960 | 9/1958 | Olmstead et al. | 415/201 |
| 3,092,393 | 6/1963 | Morley et al. | 277/56 |
| 3,166,903 | 1/1965 | White | 60/39.31 |
| 3,269,118 | 8/1966 | Benedict et al. | 60/39.31 |
| 3,299,961 | 1/1967 | Coplin et al. | 60/226 R |
| 3,398,535 | 8/1968 | Campbell et al. | 60/39.31 |
| 3,442,442 | 5/1969 | Seiwert | 415/218 |
| 3,485,252 | 12/1969 | Brown | 137/15.1 |
| 3,540,682 | 11/1970 | Dibble et al. | 415/79 |
| 3,541,794 | 11/1970 | Johnston et al. | 60/39.31 |
| 3,542,152 | 11/1970 | Adamson et al. | 60/226 R |
| 3,632,460 | 1/1972 | Palfreyman et al. | 415/217 |
| 3,640,357 | 2/1972 | Kitching et al. | 181/33 H |
| 3,769,142 | 10/1973 | Holmes | 181/33 H |
| 3,792,586 | 2/1974 | Kasmarik et al. | 60/226 R |
| 3,830,058 | 8/1974 | Ainsworth | 60/226 R |
| 3,910,374 | 10/1975 | Holehouse | 181/33 H |
| 3,914,494 | 10/1975 | Park | 181/33 H |
| 3,948,346 | 4/1976 | Schindler | 181/33 H |

Primary Examiner—Robert E. Garrett
Attorney, Agent, or Firm—Robert C. Lampe, Jr.; Derek P. Lawrence; Norman T. Musial

[57] ABSTRACT

A nacelle for use with a gas turbine engine is provided with an integral webbed structure resembling a spoked wheel for rigidly interconnecting the nacelle and engine. The nacelle is entirely supported in its spacial relationship with the engine by means of the webbed structure. The inner surface of the nacelle defines the outer limits of the engine motive fluid flow annulus while the outer surface of the nacelle defines a streamlined envelope for the engine.

14 Claims, 5 Drawing Figures

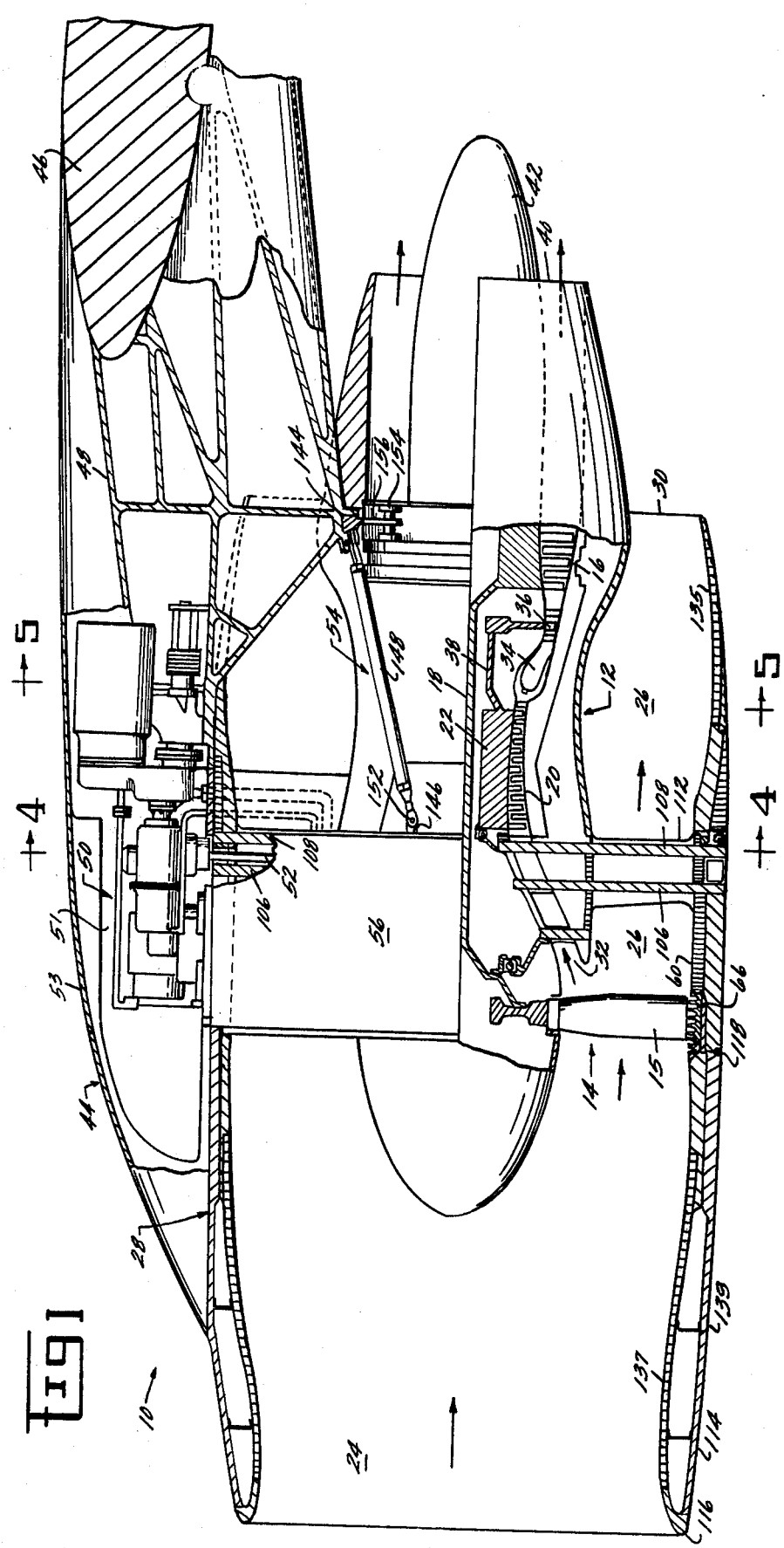

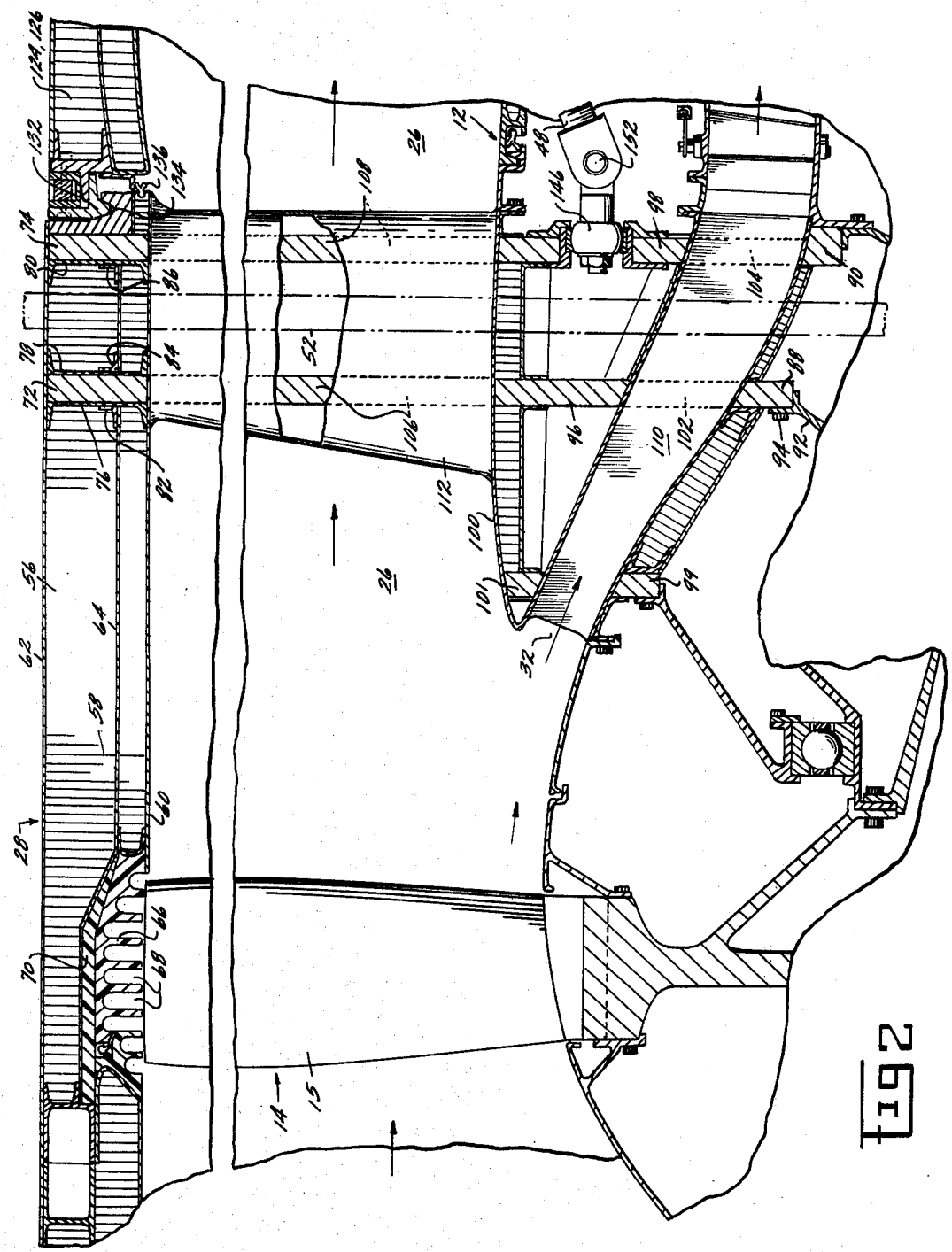

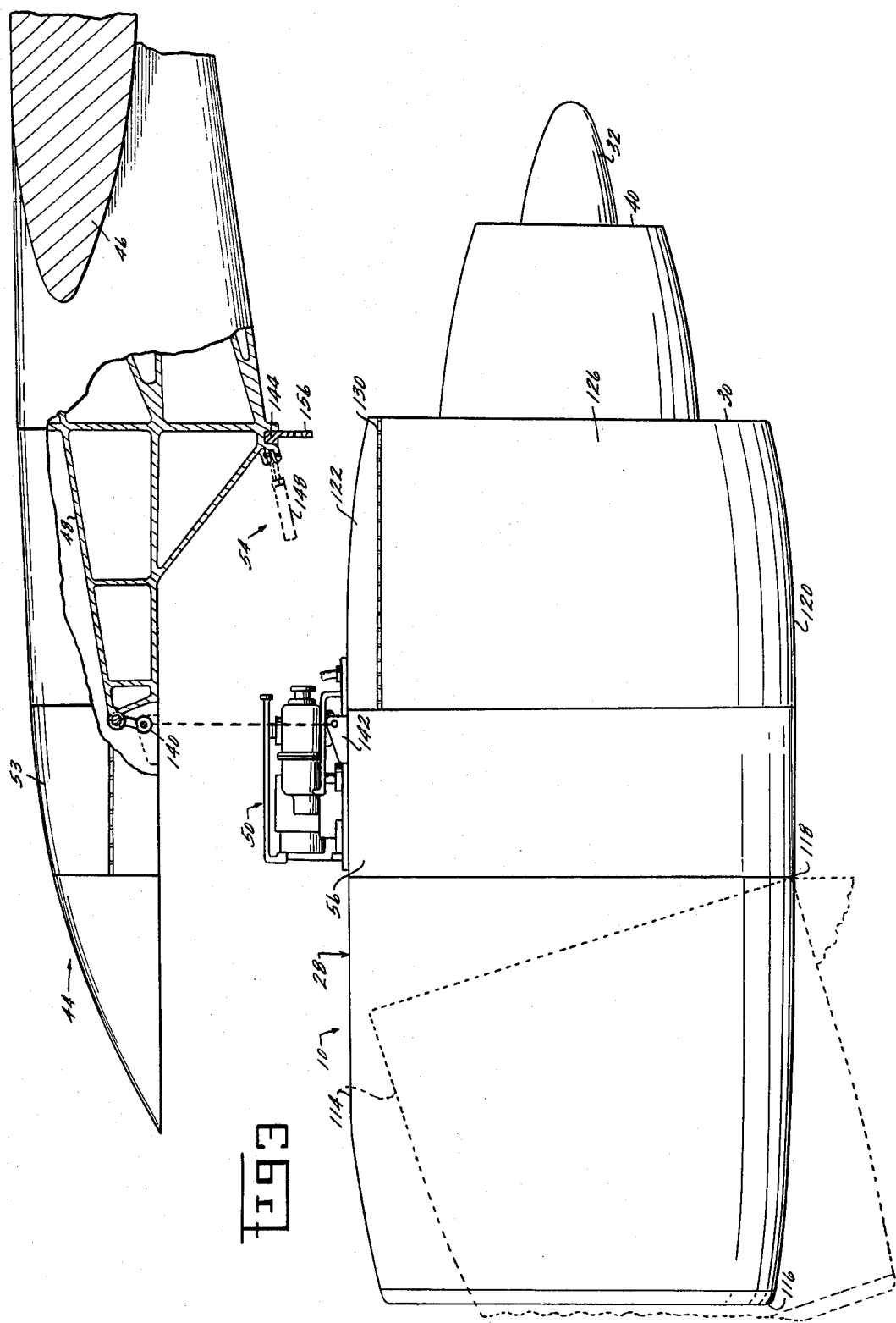

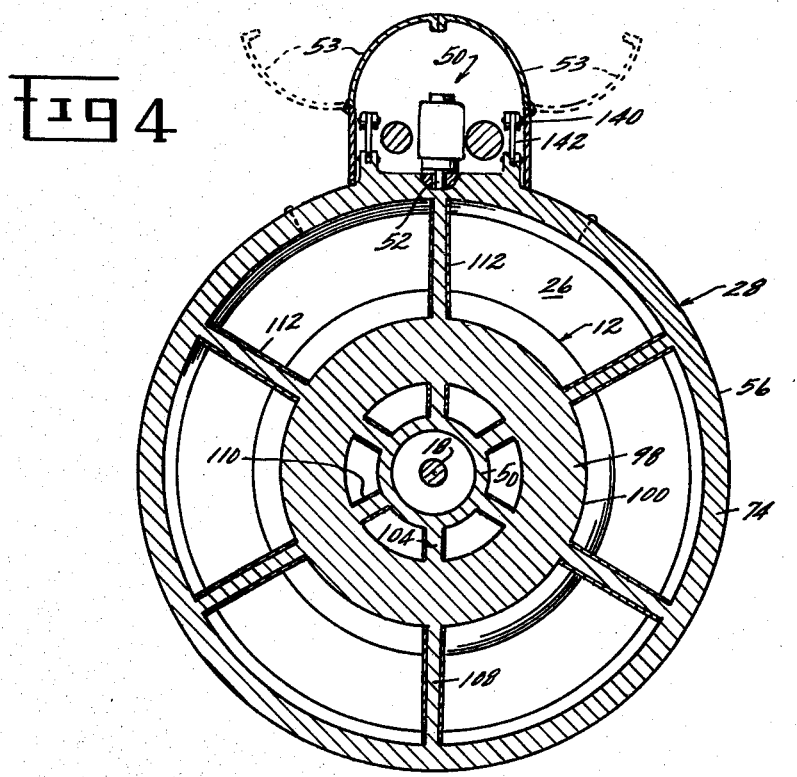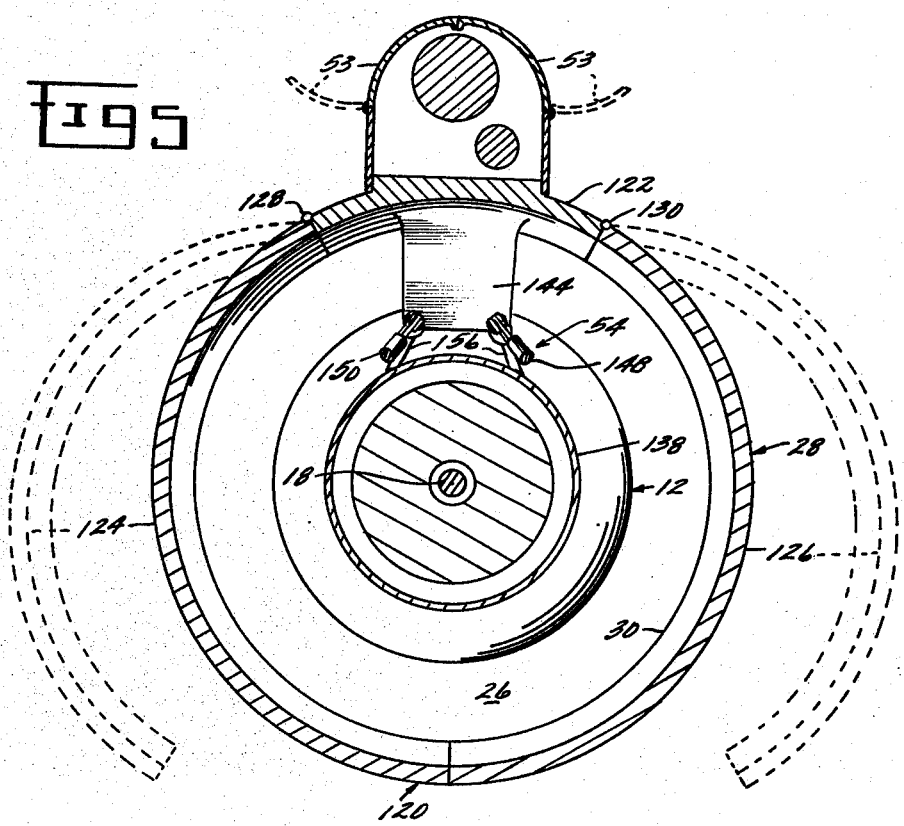

INTEGRATED GAS TURBINE ENGINE-NACELLE

The invention herein described was made in the performance of work under a NASA contract and is subject to the provisions of Section 305 of the National Aeronautics and Space Act of 1958, Public Law 85-568 (72 Stat. 435; 42 USC 2457).

This is a continuation of application Ser. No. 522,108, filed Nov. 8, 1974, now abandoned.

BACKGROUND OF THE INVENTION

This invention relates to gas turbine engines and, more particularly, to engine nacelles for use therewith.

Jet engines for powering aircraft are provided with nacelles, or other streamlined structures which envelop the engine to reduce overall aerodynamic drag and improve engine performance. With the advent of large-diameter gas turbofan engines, the required nacelle structure circumscribing the fan has become increasingly heavy, thereby increasing aircraft weight and reducing its range. The problem is compounded by the fact that since the nacelle is so large and heavy it cannot be supported by the relatively lightweight, present-day gas turbine engines. It is, therefore, hung from the aircraft pylon as is the engine itself. Accordingly, there is redundancy of structure in the nacelle and engine which could be eliminated with a lightweight, integrated engine-nacelle.

Typically, in a gas turbofan engine, a fan is provided forward of a core engine, the fan being rotatably driven through shaft connection by the turbine portion of the engine. The fan serves to pass a large volume of air around the core engine thereby increasing overall engine thrust. The large volume of air which bypasses the core engine (often several times the quantity of air taken in by the core engine) is routed through an annular fan bypass duct.

The fan bypass duct is typically defined, at least in part, by the core engine and its associated housing (or core nacelle) which comprises the inner wall of the annulus. The outer wall is defined partially by engine structure, but predominantly by the fan nacelle which, as previously noted, is supported by the pylon or aircraft wing. A shroud, or ring, is provided which circumscribes a limited axial extent of the fan bypass duct, the shroud being connected through aerodynamically faired strut means to the core engine. This webbed structure is commonly known as the fan frame. In addition to the aforementioned struts, a stage of guide vanes is disposed across the annulus to remove any angular momentum from the flow exiting the fan to thereby increase axial thrust. The struts provide the load-carrying structure for the shroud while the guide vanes are loaded only in the aerodynamic sense. Integration of the struts and guide vanes would eliminate redundancy and reduce weight. The fan nacelle circumscribes the fan frame and shroud, defining the remainder of the annular fan bypass flow path and, also, the outer streamlined envelope for the engine. Redundancy exists, therefore, in both the struts and guide vanes, and in the pylon-to-engine and nacelle-to-pylon structure.

In addition, aircraft engine removals presently require the "unbuttoning" of the nacelle in order to obtain access to the engine, an often awkward procedure at best even when the nacelle is of the bifurcated variety as typified by U.S. Pat. No. 3,541,794, Johnston et al., which is assigned to the same assignee as the present invention. An integrated engine-nacelle would simplify this procedure and would enable a relatively simple engine disconnect, exterior to the engine, at the pylon. Yet another more fundamental problem has existed through non-integration of the nacelle and engine: since the responsibility for design of the various components often lies with different manufacturers, the most aerodynamically efficient matching of the two is not achieved due to overriding individual structural considerations. An integrated engine-nacelle would optimize engine efficiency, and thereby produce an added bonus to the performance improvement achievable through the aforementioned anticipated weight reduction.

The problem facing the aircraft engine manufacturer, therefore, is to provide a lightweight nacelle integral with the engine structure which would improve overall performance through weight reduction and improved aerodynamic matching.

SUMMARY OF THE INVENTION

An object of the present invention, therefore, is to provide an integrated gas turbine engine nacelle which will reduce overall system weight and thereby improve aircraft performance.

Another object of the present invention is to provide a nacelle which will eliminate structural redundancies present in current gas turbine engine-nacelle systems.

Yet another object of the present invention is to provide an integrated engine-nacelle which is removable from an aircraft or other vehicle as a single unit.

These and other objects and advantages will be more clearly understood from the following detailed description, the drawings and specific examples, all of which are intended to be typical of rather than in any way limiting the scope of the present invention.

Briefly stated, the above objects are attained by incorporating lightweight composite materials in a unique structural relationship whereby the nacelle structure is entirely supported by the engine and wherein the supporting structure is an integral structure of the gas turbine engine. As a result of unitizing the engine and nacelle structure, redundancy is eliminated. Further, the inner surface of the nacelle may be aerodynamically contoured to provide the outer flow path wall of the annular fan bypass duct while the radially outward surface of the single thickness, though multilayered, nacelle serves as a streamlined envelope for the engine. The marriage of the nacelle supporting structure with the nacelle itself also provides greater stiffness to the assembly since the two components form one rigid piece.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given in connection with the accompanying drawings, in which:

FIG. 1 is a schematic representation of a gas turbofan engine incorporating the subject invention;

FIG. 2 represents an enlarged sectional view of a portion of the engine of FIG. 1, depicting in detail a portion of the subject invention;

FIG. 3 schematically depicts removal from a typical aircraft pylon an engine incorporating the subject invention;

FIG. 4 represents a cross-sectional view of the subject invention taken along line 4—4 of FIG. 1; and FIG. 5 is similar to FIG. 4 and shows a cross-sectional view taken along line 5—5 of FIG. 1.

DESCRIPTION OF THE PREFERRED EMBODIMENT

Referring to the drawings wherein like numerals correspond to like elements throughout, reference is first directed to FIG. 1 wherein an engine depicted generally at 10 embodying the present invention is diagrammatically shown. This engine may be considered as comprising generally a core engine 12, a fan assembly 14 including a stage of fan blades 15, and a fan turbine 16 which is interconnected to the fan assembly 14 by shaft 18. The core engine 12 includes an axial flow compressor 20 having a rotor 22. Air enters inlet 24 and is initially compressed by fan assembly 14. A first portion of this compressed air enters the fan bypass duct 26 defined, in part, by core engine 12 and a circumscribing fan nacelle 28 and discharges through a fan nozzle 30. A second portion of the compressed air enters inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting, as it will become readily apparent from the following description that the present invention is capable of application to any gas turbine engine and is not necessarily restricted to gas turbine engines of the turbofan variety. The foregoing description of the operation of the engine depicted in FIG. 1 is, therefore, merely meant to be illustrative of one type of application.

Continuing with the description of the embodiment of the invention as depicted in FIG. 1, it is shown therein that engine 10 is suspended from a pylon depicted generally at 44 which, in turn, is suspended from and integral with, for example, an aircraft wing 46 by means of truss structure 48. Pylon 44 is shown to include, and have disposed within, aircraft accessories depicted generally at 50. Critical engine accessories depicted generally at 50 are enclosed within a pocket 51 of the pylon 44 although they are an integral part of the engine hardware as clearly shown in FIG. 3. Appropriate disconnects are provided to allow separation of the engine from the pylon and aircraft accessories. These accessories are drivingly connected to the core engine 12 by means of a shaft 52. Accessories access may be obtained through pylon doors 53 (FIG. 4). The engine 10 is supported on the pylon 44 by means of a thrust mount assembly 54, which will hereafter be described with more particularity.

Referring now to FIG. 2, the inventive integrated nacelle configuration of FIG. 1 is shown in greater detail. In particular, nacelle 28 is shown to include a shroud means 56 such as a substantially cylindrical shroud, circumscribing fan blades 15 and a portion of core engine 12, the shroud consisting of a core 58 of the honeycomb type sandwiched between an inner wall 60 and an outer wall 62. Though not necessary, it may be desirable for acoustic purposes to perforate inner skin 60 to provide fluid communication between the motive fluid passing through the engine and the cellular honeycomb core as is well known in the art. Further, an intermediate wall 64 may be provided to regulate the depth of the honeycomb core 58 in communication with the motive fluid in a manner such as to "tune" the system to discrete acoustic frequencies, as is also known in the art.

Shroud 56 is also shown to include embedded therein an abradable insert 66 circumferentially disposed about the fan blade 15, which provides an abradable surface in the event of fan blade rub therewith. (Note that the fan assembly may include blades of the variable pitch variety as well as those of the fixed pitch variety.) Insert 66 may be provided with slots or grooves 68 which reduce the abradable surface area (and, therefore, the rubbing force on the blades) and which have also been shown to improve fan aerodynamic performance. Additionally, a containment ring 70 is sandwiched between the abradable insert 66 and the honeycomb core 58. Though the preferred embodiment includes honeycomb structure as the core structure 58, it is within the scope of the invention to provide a shroud of essentially solid structure with or without inner and outer walls 60, 62, respectively.

A first continuous outer hoop 72 and a similar axially displaced second outer hoop 74 are shown to circumscribe the core engine 12, these hoops being affixed to walls 60 through 64 by means of flanged braces 76 through 80 and angle braces 82 through 86. It is contemplated that outer hoops 72 and 74 could be of an integral singular material thereby obviating the need for braces 76 through 86. Further, though only two outer hoops 72, 74 are indicated, it is within the scope of the invention to provide one or more depending upon particular design criteria.

As is clearly shown in FIG. 2, hoops 72, 74 and walls 62, 64 are bonded together to form an outer annular torque box structure while hoops 72, 74 in cooperation with walls 60, 64 form a bonded inner annular torque box structure. Braces 76, 78, 80, 82, 84 and 86 bonded to the walls and hoops provide the necessary shear connections to prevent deformation of the torque boxes under all anticipated loadings. These torque boxes provide the mechanism for transferring the bending moments associated with the weight of shroud 56, and the aerodynamic loadings thereupon, into hoops 72, 74 and eventually into the core engine through struts 106, 108, soon to be described in greater particularity. Thus, walls 60, 62 and 64 are load-bearing walls which provide circumferential support for hoops 72, 74 and the loads of which are ultimately carried by core engine 12. Intermediate wall 64 is provided to regulate the depth of the innermost portion of honeycomb core 58 as has been discussed. Thus, it is convenient to utilize this wall also as a load-bearing wall, though it is clear that in some applications the intermediate wall and the inner torque box structure will not be required.

Referring now to FIGS. 2 and 4 wherein details of the novel nacelle configuration are more clearly depicted, it is apparent that the nacelle 28 resembles a wagon wheel with outer hoop 72 circumscribing the core engine 12. Inner hoops 88 and 90 coaxial with outer hoops 72, 74 are disposed within core engine 12 and serve as means to attach the nacelle to the stationary core structure 92, as by bolted connections 94. Inner hoops 88 and 90 also provide structual rigidity to the core engine 12. Disposed radially between the outer hoops and the inner hoops are intermediate hoops, herein depicted as two in number, an axially forward hoop 96 and an axially rearward one 98. These hoops provide structural rigidity as within a flow splitter 100 (FIG. 2) which serves to split the fan motive fluid into bypass portion 26 and core portion entering inlet 32. An additional pair of inner and intermediate hoops, 99 and 101, respectively, are provided to increase structural rigidity of the flow splitter and core engine structure.

Web means, such as inner struts 102 and 104, are formed integral with their respective inner and intermediate hoops and extend radially therebetween. Similarly, additional web means such as outer struts 106 and 108 are formed integral with their respective intermediate and outer hoops, also extending radially therebetween. Sheaths 110 and 112 envelop the inner and outer struts 102, 104 and 106, 108, respectively, to provide the struts with aerodynamic contours. It is recognized that the sheaths may be so constructed as to provide airfoil contours possessing characteristics such as camber and stagger. As depicted in FIG. 2, the outer struts have been contoured to serve the function of guide vanes to properly orient the motive fluid passing therethrough. The number of inner struts 102, 104 and outer struts 106, 108 need not be equal and, in fact, the sheath outer struts of FIG. 4 are depicted only schematically since considerably more would be required to provide the solidity of a typical stage of guide vanes. In essence, a unitized, wagon wheel-like nacelle frame structure is provided to entirely support the nacelle 28 upon core engine 12. In other words, an integrally bonded truss is formed which comprises the primary load-bearing structure of the nacelle. It is preferred that this unitized structure be fabricated from lightweight, high strength composite materials. Alternatively, at least a portion of the structure, such as struts 102 through 108 could be formed of bonded, laminated composite filaments.

The fan nacelle 28 further includes an inlet duct 114, having a contoured lip 116 (FIG. 1), suspended from shroud 56 and which may be formed integral therewith or removable. A hinge connection 118 may be provided to permit the inlet duct to be swung out of the way for improved access to the fan assembly 14 as depicted in phantom in FIG. 3. Alternatively, quick release fasteners of a known type could be employed, or the hinge 118 could be disposed elsewhere about the periphery of the nacelle. Further, an exhaust duct, generally indicated at 120, is mounted to the axially rearward end of the shroud 56. FIGS. 2, 3 and 5 contemplate, for example, an exhaust duct of the hinged type comprising the addition of a rearward-extending spine 122 formed integrally with shroud 56 from which nacelle doors 124 and 126 are hinged at 128 and 130, respectively. The doors are affixed to shroud 56 as by cooperating tongue 132 and groove 134 (FIG. 2) formed thereupon, respectively. Seal 136 prevents the flow of motive fluid through the joint formed by cooperating tongue 132 and groove 134. Access to the core engine 12 is provided as shown in phantom (FIG. 5). Though not shown, the core engine 12 may also be provided with a nacelle 138 of of the hinged or bifurcated variety.

In FIG. 1, it is anticipated that the inlet duct 114 and the exhaust duct 120 be constructed of lightweight, high strength, composite material. Acoustic treatment 135 of the type well known in the art may be applied to the fan bypass duct outer surface 137 formed in part by the inlet and exhaust ducts, respectively. As depicted in FIG. 1, acoustic treatment 135, at least in part, is contemplated to be of the full depth acoustic suppression material, such as honeycomb. The use of advanced composite materials is recommended such that the acoustic material can be formed integrally within the duct walls and, as shown at 135, of itself possess adequate load carrying capability. Such load bearing, full depth acoustic structure, when manufactured of composite material, will provide significant gains in weight reduction. The inner fan nacelle surface 137 (which forms the fan bypass duct outer flow path) and the nacelle outer surface 139 may be aerodynamically contoured to provide the most efficient configuration.

FIG. 3 depicts schematically the entire integrated nacelle 28 and its removal from a typical aircraft pylon 44. Truss structure 48 includes a forward pylon mount 140 which supports the engine, in part, by pin or bolt connection with engine hanger 142 while primary thrust support is obtained through thrust mount assembly 54. Rear pylon mount 144 is operatively connected to a forward engine mount 146 by means of thrust rod 148, engine mount 146 being formed integrally with intermediate hoop 98. A similar engine mount, not shown, is disposed on the other side of the engine and is connected to rear pylon mount 146 by thrust rod 150. Pin 152 (FIG. 2) facilitates connection of engine mount 146 and thrust rod 148. Rear pylon mount 144 is further connected to a rear engine mount 154 (FIG. 1) through hanger 156. Simple disconnects of a known type at pylon mounts 140, 144 permit removal of the entire integrated engine-nacelle, with pull shaft 52 separating from the engine accessories 50 which remain within pylon 44. Thus, applicants have devised a simple method of attaching a gas turbine engine to a vehicle such as an aircraft which includes the steps of first mounting the nacelle to the engine and then mounting the engine to the vehicle. Conversely, it is foreseeable that the nacelle could be hung from the aircraft and the engine then supported by the nacelle.

It should be obvious to one skilled in the art that certain changes can be made to the above-described nacelle without departing from the broad, inventive concepts thereof. For example, in certain applications it may be appropriate to support either the inlet duct 114 or the exhaust duct 120 substantially from the pylon 44 rather than from the shroud 56. Further, in a turbojet application wherein there is no fan or bypass duct, it would be possible to eliminate intermediate rings 96, 98 and interconnect inner ring 88, 90 and outer ring 72, 74 directly by means of integral spoked structure, the nacelle then comprising essentially a core engine nacelle. It is intended that the appended claims cover these and all similar variations in applicants' broader inventive concepts.

What we claim is:

1. A gas turbofan engine including a fan bypass flow annulus having an inlet and an exit, a core engine having an inlet duct communicating with said annulus, and a nacelle comprising:
   pairs of axially spaced outer, intermediate and inner coannular composite hoops, web means of composite filament construction rigidly bonding the axially forwardmost of each of said pairs of hoops together and further bonding the axially rearwardmost of each of said pairs of hoops together, wherein said pair of inner hoops is disposed within and attached to said core engine radially interior of said core engine inlet duct, and said pair of intermediate hoops is disposed within said core engine and extends substantially between the flow annulus and said core engine inlet duct;

inner and outer walls of composite filament fabrication bonded to and between said outer pair of hoops to partially define said flow annulus and the outer contour of the gas turbofan engine, respectively;

an intermediate wall of composite filament fabrication disposed between said inner and outer walls and extending axially between said pair of outer hoops to which it is bonded, wherein the pair of outer hoops and the outer, intermediate and inner walls are bonded with shear joints to form a pair of coannular inner and outer torque boxes for transferring bending moments from the walls, through said web means and into said core engine; and composite core material bonded within said torque boxes.

2. The gas turbofan engine as recited in claim 1 wherein said web means comprises at least one strut member rigidly connecting an outer hoop to an intermediate hoop.

3. A gas turbofan engine including a fan bypass flow annulus having an inlet and an exit, a core engine having an inlet duct communicating with said annulus, and a nacelle comprising:

pairs of axially spaced outer and inner coannular composite hoops, web means of composite filament construction rigidly bonding the axially forwardmost of each of said pairs of hoops together and further bonding the axially rearwardmost of each of said pairs of hoops together, wherein said pair of inner hoops is disposed within and attached to said core engine radially interior of said core engine inlet duct;

inner and outer walls of composite filament fabrication bonded to and between said outer pair of hoops to partially define said flow annulus and the outer contour of the gas turbofan engine, respectively; and an intermediate wall of composite filament fabrication disposed between said inner and outer walls and extending axially between said pair of outer hoops to which it is bonded, wherein the pair of outer hoops and the outer, intermediate and inner walls are bonded with shear joints to form a pair of coannular inner and outer torque boxes for transferring bending moments from the walls, through said web means and into said core engine.

4. The gas turbofan engine as recited in claim 3 further comprising a generally cylindrical duct attached to one of said outer hoops and the weight of which is transferred entirely through said torque boxes.

5. The gas turbofan engine as recited in claim 4 wherein said inner and outer walls extend axially from said one outer hoop to form the inner and outer contours of said duct.

6. The gas turbofan engine as recited in claim 5 wherein said duct is further characterized as an inlet duct having a contoured lip at the inlet to said annulus.

7. The gas turbofan engine as recited in claim 6 wherein said fan inlet duct is divided axially into two sections, one of which is bonded to one of said outer hoops and the other of which is hinge connected to the fixed section.

8. The gas turbofan engine as recited in claim 3 further comprising a load-bearing, full-depth, acoustic suppression core extending radially between said inner and intermediate walls, and wherein said inner wall is perforated to permit flow communication between the acoustic suppression core and the bypass flow annulus.

9. The gas turbofan engine as recited in claim 5 wherein said duct is further characterized as an exhaust duct connected to the rearwardmost of said outer hoops and provided with an exhaust nozzle at the downstream end thereof.

10. The gas turbofan engine as recited in claim 3 further comprising an axially extending arcuate spine attached to one of said outer hoops, a bifurcated duct assembly split into a plurality of circumferentially extending duct sectors circumscribing said core engine, and hinge means operatively connecting said duct sectors to said spine.

11. The gas turbofan engine as recited in claim 4 further comprising an annular abradable insert embedded within said duct substantially flush with said inner wall inner contour.

12. The gas turbofan engine as recited in claim 11 wherein said abradable insert includes a plurality of circumferential grooves open at their radially inner ends and located over a stage of rotatable fan blades.

13. The gas turbofan engine as recited in claim 12 further comprising a high-strength containment ring within said duct and surrounding said abradable insert.

14. A gas turbofan engine including a fan bypass flow annulus having an inlet and an exit, a core engine having an inlet duct communicating with said annulus, and a nacelle comprising:

pairs of axially spaced outer and inner coannular composite hoops, web means of composite filament construction rigidly bonding the axialy forwardmost of each of said pairs of hoops together and further bonding the axially rearwardmost of each of said pairs of hoops together, wherein said pair of inner hoops is attached to said core engine;

inner and outer walls of composite filament fabrication bonded to and between said outer pair of hoops to partially define said flow annulus and the outer contour of the gas turbofan engine, respectively; and wherein the pair of outer hoops and the outer and inner walls are bonded with shear joints to form a torque box for transferring bending moments from the walls, through said web means and into said core engine.

* * * * *